Nov. 28, 1944.　　　　V. BENDIX　　　　2,363,933
PORTABLE VENEER PRESS
Filed Dec. 12, 1940　　　3 Sheets-Sheet 1
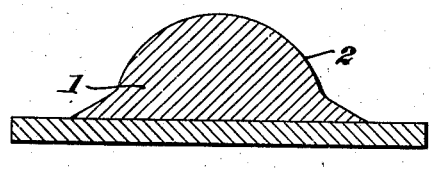
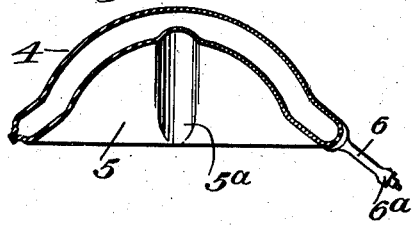
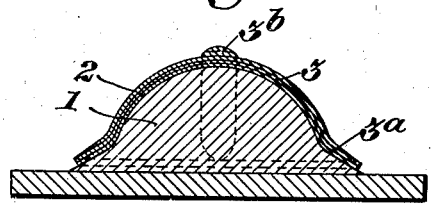
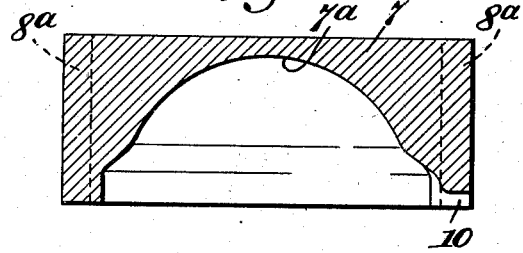
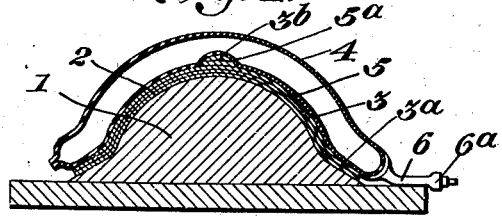
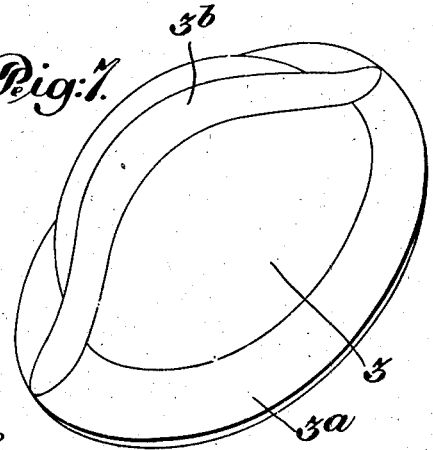
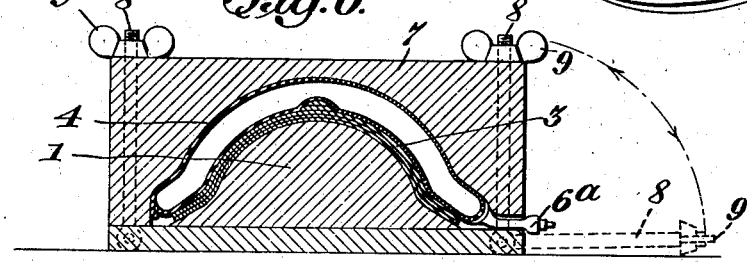
INVENTOR
Vincent Bendix
BY
Louis Prevost Whitaker
ATTORNEY

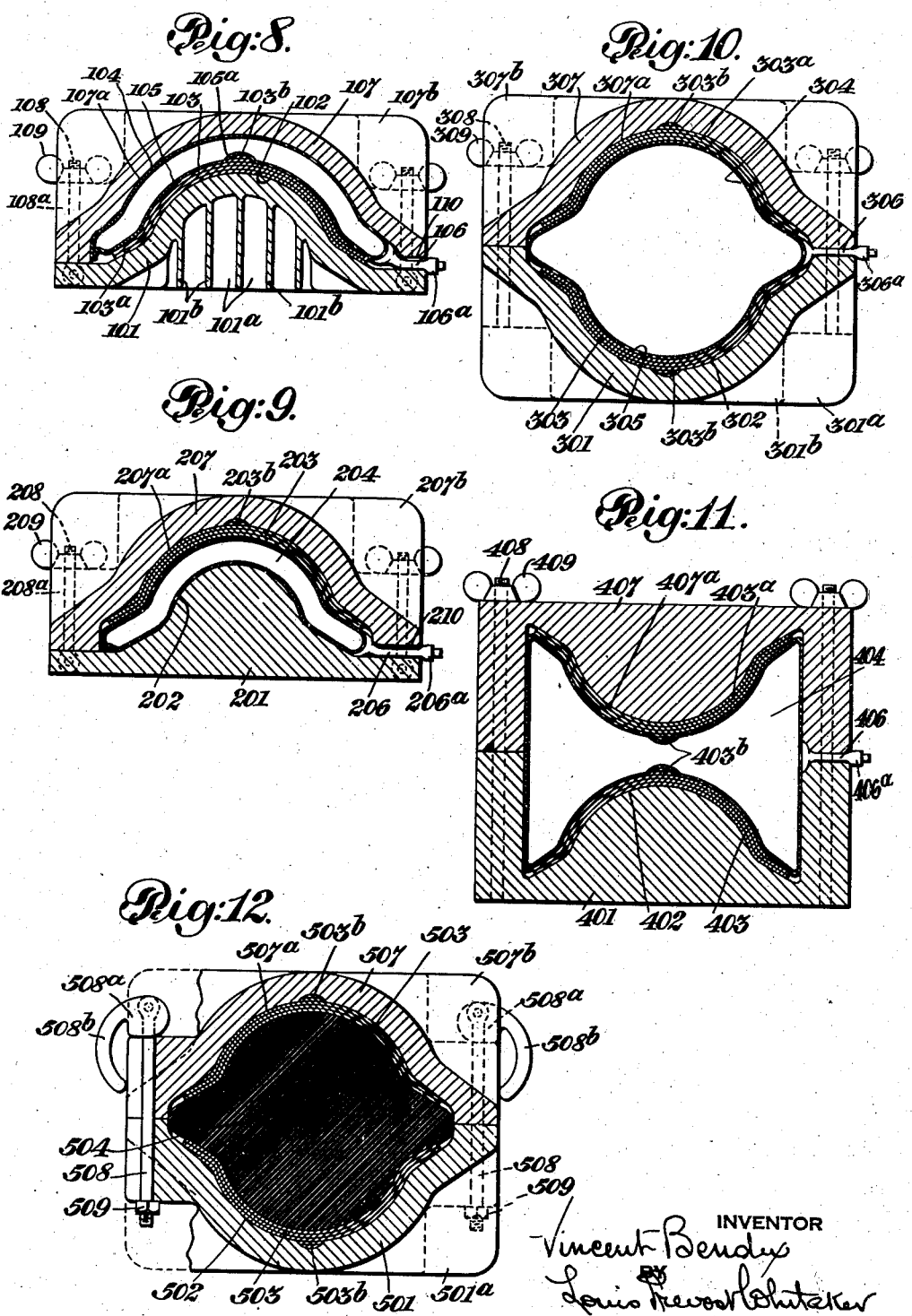

Nov. 28, 1944.   V. BENDIX   2,363,933
PORTABLE VENEER PRESS
Filed Dec. 12, 1940   3 Sheets—Sheet 3
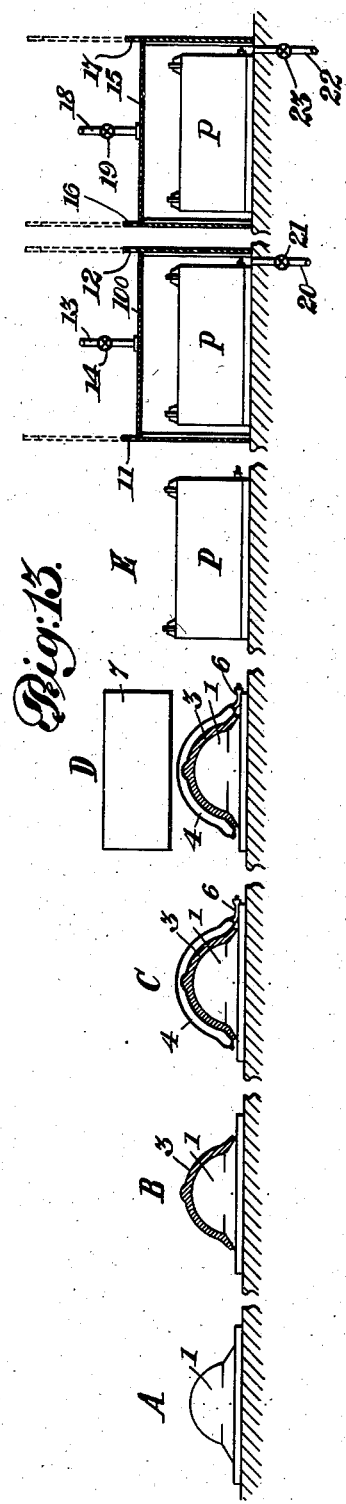
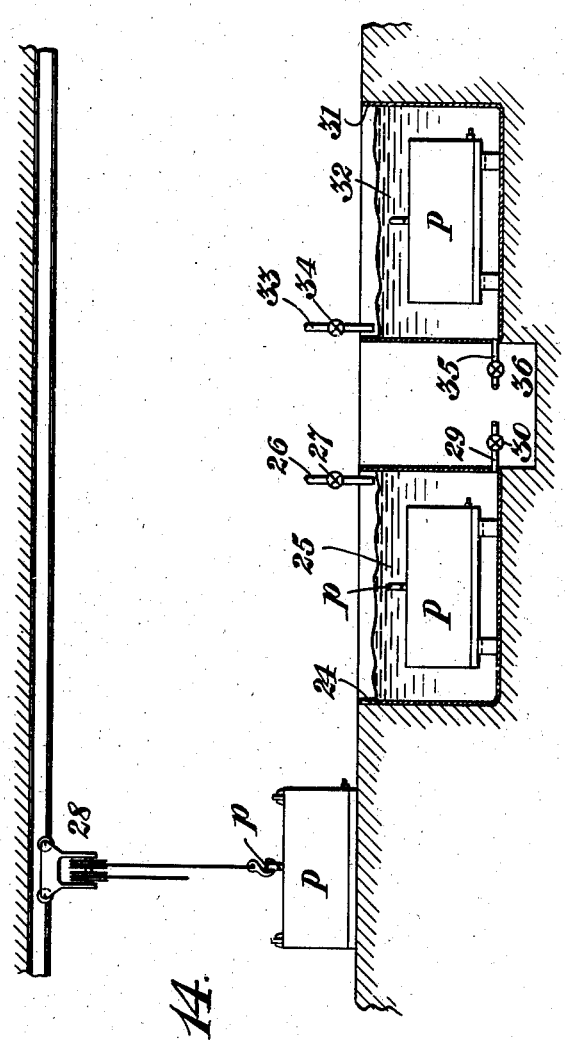
INVENTOR
Vincent Bendix
BY
Louis Kwest
ATTORNEY Patented Nov. 28, 1944

2,363,933

UNITED STATES PATENT OFFICE 2,363,933

PORTABLE VENEER PRESS

Vincent Bendix, South Bend, Ind., assignor, by mesne assignments, to Langley Aviation Corporation, New York, N. Y. a corporation of Delaware Application December 12, 1940, Serial No. 369,699

7 Claims. (Cl. 144—309)

My present invention consists in the novel features hereinafter described, reference being had to the accompanying drawings, which show one form of apparatus for carrying it into effect, and my invention is fully disclosed in the following description and claims.

The object of my present invention is to provide a process and apparatus for the mass production of articles formed of wood veneers or other laminated materials, or which are made up of such laminated materials or other separately formed parts, united by means of an adhesive or plastic material, under the action of pressure and heat and cold, whereby the parts are formed by pressure and firmly united and set by means of the adhesive material. The leading features of my present invention is the employment of a plurality of portable presses, each comprising opposed separable members, preferably of metal, between which is located an inflatable pressure applying bag, the lower press member having its upper face conforming to the lower face of the article to be produced, and the lower face of the bag preferably conforming with the upper face of the article, the said portable presses being conveyed in any suitable manner successively through chambers, in which they are acted upon by first a highly heated medium and subsequently a refrigerating medium to set the article, while the article is continuously subjected to desired pressure by inflating the bag and maintaining it inflated by means of a pressure fluid, as compressed air. The process may be rendered continuous by providing means for removing the completed articles and returning the presses to the point of origin, where they will be again provided with the laminated or other parts to be united, having their contacting faces treated or supplied with the desired adhesive material, or plastic, closing the press, inflating the bag to the desired pressure, and again passing the entire press successively through the heating and cooling chambers.

It will be understood that in the heating chamber, the presses will be subjected to a heating fluid of sufficiently high temperature to liquefy the adhesive material which may be applied in liquid form, or in sheet form, or otherwise, while the pressure exerted by the pressure fluid in the bag will force the parts together and into the desired form. Subsequent action of the cooling refrigerating medium in the cooling chamber will serve to cool the article and fix it in its united and formed condition.

In the accompanying drawings, I have shown my improved apparatus for carrying out my improved process for the manufacture of a trench helmet, which is selected for the purpose of illustrating my invention, but it will be understood that by suitably forming the members of the presses, any desired form or article may be produced.

In the drawings,

Fig. 1 is a sectional view of the lower or mold member of one of the presses, upon which the article is formed.

Fig. 2 is a similar view of the lower or mold member, showing the laminated material applied thereto.

Fig. 3 is a sectional view of the pressure applying bag.

Fig. 4 is a sectional view showing the lower mold member with the laminated or other material applied thereon, as in Fig. 2, and the pressure applying bag in position above the said material.

Fig. 5 is a sectional view of the upper member of the press.

Fig. 6 is a sectional view of a complete press, showing the various parts enclosing the material for the formation of the article to be produced, the upper and lower press members being rigidly connected and the pressure applying bag inflated.

Fig. 7 is a perspective view of the article for which the particular press illustrated is designed to produce.

Fig. 8 is a sectional view similar to Fig. 6, showing the mold members provided with recessed portions and radiating fins.

Fig. 9 is a view of a similar form of press to that indicated in Fig. 6, except that the laminated material directly engages the concave inner face of the mold member against which it is forced by the inflatable pressure bag which is confined between the laminated material and the other press member.

Fig. 10 is a vertical sectional view of a modified form of press in which both the upper and lower press members are provided with concave surfaces against which the laminated material is pressed by a single pressure bag acting directly upon both portions of the laminated material and located centrally between the press members, which in this case are both mold members.

Fig. 11 is a similar section of a further modified form of press in which the upper and lower press members are both mold members and are provided with oppositely disposed convex portions against which the laminated material is pressed by a centrally located pressure bag for the simultaneous formation of two separate articles.

Fig. 12 is a sectional view of a further modified form of press, in which, instead of the pressure bag, a solid deformable pressure member is provided in this instance for the formation of two separate articles, the material for which is subjected to pressure against convex inner faces of the upper and lower press members, which in this case also are both mold members.

Fig. 13 is a detailed view showing the various steps in the herein described process and illustrating the successive heating and cooling chambers employed therein.

Fig. 14 is a modified form of apparatus for successively treating the mold to a heating and cooling medium in the carrying out of my improved process.

In Figs. 1 to 6 of the drawings, 1 represents the lower press member or mold, which is preferably formed of metal as lead for example, and has its upper face convex and modeled in any suitable manner, so that it will conform exactly to the lower face of the article to be produced, which, in this instance, is a trench helmet shown in Fig. 7. It will be understood that the laminated material, such as wood veneers or the like, which may be assembled elsewhere, are applied to the mold or press member 1, or they may be built thereon in any suitable manner and held in position thereon by straps or other means, the contacting faces of the separate veneers or other parts being provided with a suitable adhesive material, which is preferably an artificial resin, such as phenolic condensation products, or other suitable plastic, which will, under pressure and the successive applications of heat and cold, firmly unite the parts of the article to be formed and be thereafter unaffected by atmospheric conditions or moisture. The adhesive material may be applied to the opposed surfaces, and also to the upper and lower or exterior surfaces of the article, in liquid form, or it may be in sheet form and laid between the opposed surfaces to be united. The material forming the article to be produced is indicated at 3 in Fig. 2, and as will be observed from that figure, it may be of uniform thickness or non-uniform thickness, as may be desired, according to the configuration of the article to be produced.

Fig. 3 is a sectional view of the yielding pressure member, here shown in the form of a pressure applying bag 4, which is formed of suitable material, preferably rubber, reinforced if desired by fibrous or textile material, the inner surface of the bag, indicated at 5, being made to conform exactly with the outer surface of the article to be produced. In this instance it will be noted that the helmet, shown at 3 in Fig. 7, is provided with a brim indicated at 3a, and also with a reinforcing projecting rib at its outer surface, indicated at 3b, and the work engaging face of the bag will therefore be provided with a grooved portion on its under surface, indicated at 5a, to conform to the rib or bead 3b.

Fig. 4 represents the bag 4 in place upon the laminated material upon the mold or press member 1 and partially inflated through a valved inflating pipe 6, by any suitable means for supplying compressed air or other fluid, and which may be conveniently means similar to those employed in the inflation of pneumatic tires.

Fig. 5 represents the upper press member or mold member 7, which is also preferably formed of metal, as lead for example, and has its lower face 7a concave and conforming with the upper surface of the pressure bag 4, when inflated, to prevent wrinkling. This upper press member 7 is placed upon the lower press member and rigidly secured with respect thereto in any usual or desired manner. In the present instance I have shown the lower press member provided with a plurality of bolts 8, pivoted thereto, and engaging recesses 8a in the upper mold member and provided with suitable securing means, as wing nuts 9, for example, which permit the upper and lower members to be rigidly connected. The upper mold member 7 is also provided with a recess 7b to give access to the inflating valve 6a of the pressure applying bag 4. After the material has been assembled on the lower press member 1, as before described, and provided with the adhesive material or plastic, the bag 4 is applied thereto, and then the upper press member placed in position and secured to the lower member 1. The bag 4 is then inflated, preferably with compressed air, to the desired pressure. Obviously the upper mold member acts as a retaining member for the bag, so that pressure per square inch to which the bag is inflated will be exerted in absolute uniformity upon all portions of the upper surface of the article to be produced and against the solid resistance of the lower press member, thus holding the parts of the article and the adhesive material in united relation.

The various steps hereinabove described are indicated successively at stations A, B, C, D, and E in Fig. 13, and it will be understood that these steps may be performed in succession as the lower press member of a series of presses is conveyed horizontally by sliding over a smooth surface or support, or by being carried on a horizontal conveyor, as may be found most desirable. The upper press member, which is applied at the station indicated at D in Fig. 13, may be suitably supported above the lower mold member and travel therewith through stations A, B and C, or may be applied at station D and secured to the lower mold member, the bag being thereafter inflated at station E, as may be found most desirable.

In carrying out my process, when the material has been assembled upon the lower mold member and the pressure applying bag is placed thereon, the upper press member located in operative position, and the bag inflated, the entire apparatus is inserted in a heating chamber indicated at 100 in Fig. 13. The heating chamber is shown as provided at its opposite ends with vertically movable doors 11 and 12, and the chamber 100 is shown provided with a pipe 13 having a controlling valve 14 for the admission of a heating medium, as steam for example. The chamber will be maintained at any desired temperature by any well known or preferred means. As the molds or presses arrive at the heating chamber, the doors 11 and 12 will be opened so as to permit one mold or press with its enclosed laminated material to be inserted in the heating chamber, and at the same time a previously treated mold may be forced out and into the cooling chamber, indicated at 15, the doors 16 and 17 of which are simultaneously opened. In like manner, the previously treated mold in the cooling chamber 15 will be discharged from the cooling chamber, as will be readily understood, after which the oors 11, 12, 16 and 17 will be closed to permit the molds or presses within the heating and cooling chambers 100 and 15 respectively to be subjected to the heating and cooling temperatures herein. Obviously the heating and cooling chambers will be of sufficient size to accommodate the number of presses desired. I have shown the cooling chamber provided with an inlet pipe 18 controlled by valve 19 for admitting a cooling or refrigerating medium to the cooling chamber. It will be obvious that the heating chamber may be provided with an outlet pipe 20 controlled by a valve 21 and that the cooling chamber may be provided with an outlet pipe 22 controlled by a suitable valve 23 if desired, so that the heating as well as the cooling medium may be circulated, and also that the heating and cooling fluid employed may be drawn off and returned to any suitable source before the opening of the doors, if desired.

It is to be understood that any suitable heating or cooling medium may be employed and that if a heating or cooling liquid is found desirable, the respective presses or molds will be formed in such manner as to be liquid tight or encased in a liquid tight enclosure, or otherwise protected from any possible injurious action of the liquid upon the articles to be produced. This precaution may also be resorted to in case of the use of any heating or cooling fluid which might otherwise produce injurious effects if brought directly into contact with the articles to be formed.

In some cases the molds may be subjected to the action of heat and cold by immersing them in suitable containers supplied with a heating or cooling liquid. Thus, in Fig. 14 for example, I have shown a tank or container 24 for hot water or other liquid, indicated at 25, and supplied by a pipe 26 under the control of a valve 27 into which liquid, the portable presses, indicated as a whole at P, may be successively lowered by means of a traveling crane 28, the hook of which engages a suitable lifting eye p on the upper press member for conveniently handling the presses. After suitable treatment in the heating tank the presses are removed and deposited in the cooling tank, indicated at 31, shown at the right in Fig. 14. This tank will contain a cooling liquid 32, such as brine for example, which may be supplied by means of a pipe 33 under the control of a valve 34 from any suitable source. I have also shown the heating tank 24 provided with an outlet pipe 29 under the control of a valve 30 and the cooling tank 31 provided with an outlet pipe 35 controlled by a valve 36 so that circulation of the heating and cooling liquids to which the molds and their contained articles are successively subjected, may be effected for the purpose of maintaining the desired high and low temperatures thereof.

It will be understood with reference to Figs. 13 and 14 that when the presses are subjected to heat, the temperature will be sufficient to cause the adhesive material or plastic to soften and penetrate into the contiguous surfaces of the laminated material, and unite them, after which the following cold temperature treatment will more quickly cool the plastic material, and thereby render the completed article substantially as rigid as if it were composed of a single piece of material.

I ordinarily prefer also to coat the exterior surfaces of the article to be produced with the adhesive or plastic material before referred to, in order that under the heating treatment it may be caused to penetrate into the outer surface of the article, and thereafter be set, so as to provide an exterior surface for the article, which will be unaffected by moisture or atmospheric conditions, as will be readily understood.

In order that the articles to be produced shall not adhere to the parts of the press or mold, to wit, the lower member, and the pressure applying bag or its equivalent, the surfaces of the article itself or the contiguous faces of the adjacent mold member and bag will be provided with a suitable material which may be either in the form of liquid, powder or sheet material, and which will prevent the adhesion of the article to the contiguous portions of the press.

In Fig. 8, in which the corresponding parts as those shown in Figs. 1 to 6 are given the same reference numerals with the addition of 100, I have illustrated a slightly modified form of press in which the lower mold member 101 is cored or hollowed out, as indicated at 101a, to save weight and material, and to form or provide heat conducting fins, indicated at 101b. The upper mold member 107 is likewise provided with similar recessed portions providing fins 107b for the same purpose. It will be understood that when the press is subjected to the heating medium in the heating chamber, the heat radiating fins 101b and 107b will facilitate the transference of heat through the parts of the mold including both mold members and the pressure bag and its contained pressure fluid, so that the heat from the heating medium will affect both the inner and outer faces of the article, as will be readily seen from an examination of Fig. 8. Likewise, when the mold so constructed is subjected to the cooling medium in the cooling chamber, the heat transferring fins will facilitate the removal of heat units from the mold or press and the article being formed, so as to more quickly cool the adhesive material or plastic and bring the article to its final and permanent form.

In Figs. 1 to 6 and 8 the laminated material forming the article to be produced is arranged upon the convex surface of the lower mold member and forcibly pressed upon and against the exterior convex surface of said mold member by the pressure applying bag. While I prefer to follow this arrangement, I do not wish to be limited thereto, as it is entirely practicable and in some instances may be found extremely desirable to arrange the laminated material in contact with a concave forming surface and applying pressure by means of the bag to the concave surface of the article. Thus in Fig. 9, in which the parts corresponding with those shown in Figs. 1 to 6 are given the same reference characters with the addition of 200, I have shown the laminated material 203 arranged in direct contact with the inner concave face 207a of the upper mold member 207 and forced against said face 207a by means of the bag 204, the lower face of the bag being supported by the upper convex face 202 of the lower press member or mold 201. The operation will obviously be exactly the same as previously described with reference to Figs. 1 to 6, inclusive.

I also desire to have it understood that in some instances the mold members may be provided with oppositely disposed concave or convex portions to receive simultaneously laminated material for the simultaneous production of two of the articles to be formed, which normally would be of the same form, but need not necessarily be similar, the laminated material being subjected to pressure against these opposed surfaces by a single pressure applying bag arranged between them. Thus, in Fig. 10, in which the parts corresponding to those shown in Figs. 1 to 6 are given the same reference characters with the addition of 300, I have shown both the lower mold 301 and the upper mold 307 provided with concave forming surfaces 302 and 307a, respectively, to receive the laminated material, indicated at 303 and 303a, for the simultaneous production of two articles. 304 represents a pressure applying bag occupying the central space within the mold members and having oppositely disposed portions 305 and 305a for engaging the inner faces of the laminations 303 and 303a. Obviously when the required pressure is obtained within the bag 304 it will be uniformly applied to the inner faces of both the articles to be formed, and the operation as to each will be substantially the same as hereinbefore described with reference to Figs. 1 to 6, except that two articles will be produced instead of one. These two articles may be, as before stated, of similar or dissimilar form, but will preferably be of similar form, as shown, and may in some instances be halves of a single article to be finally united for the formation of a single article after they have been subjected to pressure, heat and cold, as previously described. As will be seen from Fig. 10, the pressure applying element 304 is self-centering or "floating," so that equal pressure is applied to the two articles being formed.

In Fig. 11, in which the parts corresponding to those in Figs. 1 to 6 are given the same reference characters with the addition of 400, I have shown the lower mold or press member 401, and also the upper mold member 407, each provided with a convex inwardly extending face 402 and 407a respectively, upon which the laminated material, indicated at 403 and 403a, will be supported and against which they will be pressed by the interior bag 404, as clearly shown in Fig. 11.

While I have shown in the preceding figures the application of pressure by means of an inflatable bag member, I do not wish to be limited to such a means for the application of pressure to force the laminated material into firm contact with either a convex or a concave face of a contiguous mold member. For example, in Fig. 12, in which the parts corresponding to those shown in Figs. 1 to 6 are given the same reference characters with the addition of 500, there is illustrated a press having a lower mold member 501 and an upper mold member 507, in this instance corresponding with the mold members illustrated in Fig. 10 and having interior opposed concave faces upon which the laminated material 503—503 is supported. In this instance I have shown as the pressure applying means a solid deformable body, indicated at 504, preferably composed of rubber or rubber composition and of a size or volume greater than that of the interior of the mold when the mold members are brought together. In this instance the mold members are provided with connecting bolts 508 provided at one end with cams 508a and operating levers 508b therefor, so that by the operation of these cams 508a the mold members can be brought together upon the deformable solid material and force it into contact with the inner faces of the laminated material so as to apply uniform yielding elastic pressure thereto, due to the interior stress set up within said solid deformable material.

While the rubber mass is not itself compressible, it is highly elastic and placing it under a deforming pressure will establish a very considerable stress within the mass, tending to return to its normal form and this stress will be uniformly applied to the laminated material forming the article, or articles, acted upon. The amount of pressure exerted by the deformed rubber mass may be varied some by varying the original size and configuration of the mass itself and also by varying the amount of pressure applied to it by the connecting bolts 508, for which purpose these bolts are preferably provided with adjusting nuts 509, as shown in Fig. 12.

In some instances this interior mass of rubber or rubber composition may be used with satisfactory results instead of the inflatable bag shown elsewhere and previously described, but for ordinary purposes I prefer to employ the inflatable bag.

It will be understood that the dies or molds and the elastic members of Figs. 10 to 12 have surfaces of double curvature to make articles of the shape shown in Fig. 7.

What I claim and desire to secure by Letters Patent is:

1. The herein described process, which consists in separately applying an assembly of laminated material provided with adhesive material between contiguous faces thereof upon opposed interior faces of separable press members, each of which conforms to a face of an article to be formed thereon, interposing between the inner faces of said separately located assemblies of laminated materials a floating, self-centering, yielding pressure applying device, securing the separate press members with respect to each other and applying pressure through said yielding pressure applying device to distribute it uniformly throughout the engaged surfaces of said separate assemblies of laminated material, and subjecting said laminated material successively to heat and cold while maintaining said pressure thereon.

2. The herein described process, which consists in separately applying an assembly of laminated material provided with adhesive material between contiguous faces thereof upon opposed interior faces of separable press members, each of which conforms to a face of an article to be formed thereon, interposing between the inner faces of said separately located assemblies of laminated materials a substantially solid self-centering body of elastic deformable material, drawing the press members together to apply and maintain pressure on said body, and distribute said pressure uniformly to said separate assemblies of laminated material, and subjecting said assemblies successively to heating and cooling fluids, while subjected to said pressure.

3. Apparatus for producing articles formed of laminae united by adhesive material and having surfaces of double curvature comprising a portable veneer press comprising opposed mold members at least one of which is provided with a contoured mold face of double curvature conforming to a face of the article to be produced, an elastic deformable pressure distributing member interposed between said mold members and having a flexible, work-engaging face of double curvature contoured to conform to the opposite face of said article, means for connecting said mold members together to apply uniform yielding pressure to said article disposed between said contoured faces, means for transferring said press from one station to another while maintaining said yielding pressure and means for subjecting the article to different temperatures at different stations.

4. The herein described process of producing unitary articles having surfaces of double curvature, which consists in progressively moving a mold member through a plurality of operating and processing stations, applying an assembly of material comprising separately formed parts provided with thermoplastic material between contiguous faces thereof upon a forming face of said mold member conforming to one face of the article to be produced, securing the material in position on said member in approximate conformity with said face, applying to said assembly a yielding pressure applying and distributing element having a flexible work-engaging face of double curvature conforming to another face of said article, applying a second mold member to support said element, connecting said mold members and applying uniformly distributed, yielding pressure through said element to the assembled material, transferring the assembled mold to another station while maintaining said yielding pressure, subjecting the assembly to a heating fluid to activate said thermoplastic material, transferring the mold to a further station while still maintaining said yielding pressure and subjecting the assembly to a cooling fluid.

5. The combination with a portable veneer press, comprising separable members having opposed convex surfaces each conforming to a face of an article to be produced and adapted to receive an individual assembly of laminated material, a floating self-centering elastic pressure distributing device adapted to be interposed between the inner faces of said laminated material assemblies and having flexible work-engaging faces conforming respectively to said inner faces, and means for detachaby connecting the separable press members and applying uniform pressure simultaneously to the assembled material for each of the articles to be produced, of means for subjecting said material while held under pressure in said press to the successive action of heat and cold.

6. A portable veneer press comprising separable mold members having opposed surfaces each conforming to a face of an article to be produced and adapted to receive an individual assembly of laminated material, a floating, self-centering, pressure distributing device comprising a substantially solid body of elastic deformable material interposed between said members and having opposite flexible faces generally conforming respectively to the opposite faces of said separate articles, and means carried by said mold members for connecting said members together and drawing them toward one another to apply uniform pressure to said separate articles disposed between said mold members and said elastic body.

7. The herein process of producing unitary articles having surfaces of double curvature, which consists in progressively moving a mold member through a plurality of operating and processing stations, applying an assembly of material comprising separately formed parts provided with thermoplastic material between contiguous faces thereof upon a forming face of said mold member conforming to one face of the article to be produced, securing the material in position on said member in approximate conformity with said face, applying to said assembly an expansible pressure applying and distributing element having a flexible work-engaging face of double curvature conforming to the entire opposite face of said article, applying a second mold member to support said element, correcting said mold members, and supplying pressure fluid to said element to apply uniformly distributed, yielding pressure, through said element to the assembled material, transferring the assembled mold to another station while maintaining said yielding pressure, subjecting the assembly to a heating fluid to activate said thermoplastic material, transferring the mold to a further station while still maintaining said yielding pressure and subjecting the assembly to a cooling fluid.

VINCENT BENDIX.